(12) United States Patent
Shumarayev et al.

(10) Patent No.: US 7,804,892 B1
(45) Date of Patent: Sep. 28, 2010

(54) CIRCUITRY FOR PROVIDING PROGRAMMABLE DECISION FEEDBACK EQUALIZATION

(75) Inventors: Sergey Y Shumarayev, San Leandro, CA (US); Rakesh H Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 1105 days.

(21) Appl. No.: 11/347,527

(22) Filed: Feb. 3, 2006

(51) Int. Cl.
H03H 7/40 (2006.01)
(52) U.S. Cl. .................................................... 375/229
(58) Field of Classification Search ................. 375/229, 375/230, 232, 233
See application file for complete search history.

(56) References Cited

U.S. PATENT DOCUMENTS

| | | | |
|---|---|---|---|
| 5,490,169 A * | 2/1996 | Blackwell et al. ............ 375/232 |
| 5,841,810 A * | 11/1998 | Wong et al. .................. 375/232 |
| 6,304,106 B1 * | 10/2001 | Cecchi et al. ................. 326/86 |
| 6,650,140 B2 * | 11/2003 | Lee et al. ...................... 326/39 |
| 6,867,616 B1 * | 3/2005 | Venkata et al. ................ 326/41 |
| 6,870,404 B1 * | 3/2005 | Maangat ........................ 327/65 |
| 6,880,056 B2 * | 4/2005 | Kootstra ...................... 711/168 |
| 6,888,376 B1 | 5/2005 | Venkata et al. |
| 7,499,489 B1 * | 3/2009 | Ellersick et al. ............. 375/229 |
| 2001/0033188 A1 * | 10/2001 | Aung et al. .................. 327/141 |
| 2002/0084870 A1 * | 7/2002 | Cranford .................... 333/165 |
| 2004/0140837 A1 * | 7/2004 | Venkata et al. .............. 327/223 |
| 2004/0258181 A1 * | 12/2004 | Popescu et al. .............. 375/327 |
| 2004/0264562 A1 * | 12/2004 | Wu et al. ..................... 375/233 |
| 2005/0095988 A1 | 5/2005 | Bereza et al. |
| 2005/0265440 A1 * | 12/2005 | Sohn .......................... 375/233 |
| 2005/0271136 A1 * | 12/2005 | Chung et al. ................. 375/233 |
| 2006/0045176 A1 * | 3/2006 | Moughabghab et al. ..... 375/232 |
| 2006/0098727 A1 * | 5/2006 | Kuijk .......................... 375/232 |
| 2006/0291552 A1 * | 12/2006 | Yeung et al. ................. 375/233 |

OTHER PUBLICATIONS

U.S. Appl. No. 10/059,014, filed Jan. 29, 2002, Lee et al.
U.S. Appl. No. 10/273,899, filed Oct. 16, 2002, Venkata et al.
U.S. Appl. No. 10/317,264, filed Dec. 10, 2002, Venkata et al.
U.S. Appl. No. 10/637,982, filed Aug. 8, 2003, Venkata et al.
U.S. Appl. No. 10/668,900, filed Sep. 22, 2003, Asaduzzaman et al.
U.S. Appl. No. 10/672,901, filed Sep. 26, 2003, Asaduzzaman et al.

(Continued)

*Primary Examiner*—Chieh M Fan
*Assistant Examiner*—Jaison Joseph
(74) *Attorney, Agent, or Firm*—Ropes & Gray LLP; Robert R. Jackson (57) ABSTRACT

Equalization circuitry may be implemented by cascading a plurality of equalization stages. Each equalization stage may compensate for some of the attenuation of a received data signal. Each equalization stage may also be configured to perform decision feedback equalization to remove distortion from the current bit of data signal caused by one of the preceding bits in the data signal. Each equalization stage may be controlled by a DFE coefficient that determines the amount of voltage with which to adjust the output of the equalization stage. The equalization circuitry may be implemented on a receiver that includes clock data recovery circuitry and a pipeline/deserializer for providing preceding bit values to the equalization stages.

25 Claims, 6 Drawing Sheets

OTHER PUBLICATIONS

U.S. Appl. No. 10/713,877, filed Nov. 13, 2003, Churchill et al.
U.S. Appl. No. 10/740,120, filed Dec. 17, 2003, Wang et al.
U.S. Appl. No. 10/739,445, filed Dec. 17, 2003, Kwasniewski et al.
U.S. Appl. No. 10/762,864, filed Jan. 21, 2004, Wong et al.
U.S. Appl. No. 10/853,987, filed May 25, 2004, Wong et al.
U.S. Appl. No. 10/967,459, filed Oct. 18, 2004, Wang et al.
U.S. Appl. No. 11/040,342, filed Jan. 21, 2005, Shumarayev et al.
U.S. Appl. No. 11/182,658, filed Jul. 14, 2005, Maangat et al.
U.S. Appl. No. 11/192,539, filed Jul. 28, 2005, Shumarayev et al.

* cited by examiner

CIRCUITRY FOR PROVIDING PROGRAMMABLE DECISION FEEDBACK EQUALIZATION

BACKGROUND OF THE INVENTION

This invention relates to circuitry for providing programmable decision feedback equalization.

A so-called high speed serial interface ("HSSI") may be used to communicate between devices in a system. Typically, it is the intention for the transmitter in such a system to transmit a digital (binary) signal having two distinctive levels, and well-defined (i.e., very steep) transitions from either of these levels to the other level. Such steep transitions are essential to transmitting data at high speed. The medium that conveys the signal from the transmitter to the receiver usually imposes losses on the signal being transmitted. These losses generally include diminished signal amplitude and reduced transition steepness. To maintain accurate, high-speed data transmission, it is necessary for the circuitry to compensate for these losses.

One way to do this is for the transmitter to give the signal pre-emphasis. This means giving the signal extra energy immediately after each transition. The extra energy can be extra amplitude (voltage) and/or current. At very high data rates (e.g., in the range of about 3 gigabits per second (3 Gbps) and above), pre-emphasis can have the disadvantage of giving the signal being transmitted high frequency components that can undesirably couple to other circuitry.

To avoid the above-described disadvantages of pre-emphasis, it may be preferable to use what is called equalization at the receiver. Equalization circuitry is typically among the first circuitry that the incoming signal sees when it reaches the receiver. Equalization circuitry is designed to respond strongly and rapidly to any transition detected in the received signal. This strong and rapid response restores the original steepness to these transitions, thereby making it possible for further circuitry of the receiver to correctly interpret the signal, even at the very high data rate of that signal.

Decision feedback equalization (DFE) is another type of equalization that may be performed to compensate for distortion caused by the spreading and overlapping of bits in a data signal (i.e., intersymbol interference). In many instances, decision feedback equalization requires an engine to determine the amount of distortion to attribute to each bit, which is expensive to implement and requires a great deal of power. It would be desirable to implement decision feedback equalization for lower-cost receivers.

SUMMARY OF THE INVENTION

Equalization circuitry may be provided to perform equalization and decision feedback equalization. The equalization circuitry may include a plurality of equalization stages that are coupled in series.

Each equalization stage may include a component for providing equalization to a received data signal. In particular, the equalization stage may apply a gain to the high-frequency components (e.g., the bit transitions) in the data signal.

Each equalization stage may also include components for performing decision feedback equalization. In particular, the equalization stage may include transistors coupled to the positive and negative ends of the output that allow a programmable current source to draw current from either the positive or negative end of the output. Recovered bit values from preceding bits of the data signal may determine whether current is drawn from the positive or negative end of the output.

The equalization stage may include load resistors coupled between the source voltage and the positive and negative ends of the output. The programmable current source may be programmed to produce a current that causes the voltage drop across the load resistor to be adjusted by an amount comparable to the amount of distortion caused by the preceding bit associated with the equalization stage. As a result, the data signal is adjusted to compensate for the distortion caused by the preceding bit.

The equalization stages in the equalization circuit may each receive a different preceding bit. In this approach, the equalization stages may adjust the data signal to compensate for distortion caused by several preceding bits in the data signal.

The equalization circuit may be implemented on a receiver. The receiver may also include clock data recovery circuitry for recovering a data signal and a clock signal from the output of the equalization circuitry and a pipeline or deserializer for storing bits recovered by the clock data recovery circuitry. The pipeline or deserializer may feed back the bits to the equalization circuitry, which represent bits that precede the bit currently being processed by the equalization circuitry. In some embodiments, switches may selectively provide the preceding bits to the equalization circuitry.

Further features of the invention, its nature and various advantages, will be more apparent from the accompanying drawings and the following detailed description.

DETAILED DESCRIPTION OF THE PREFERRED EMBODIMENTS

Figure 1:
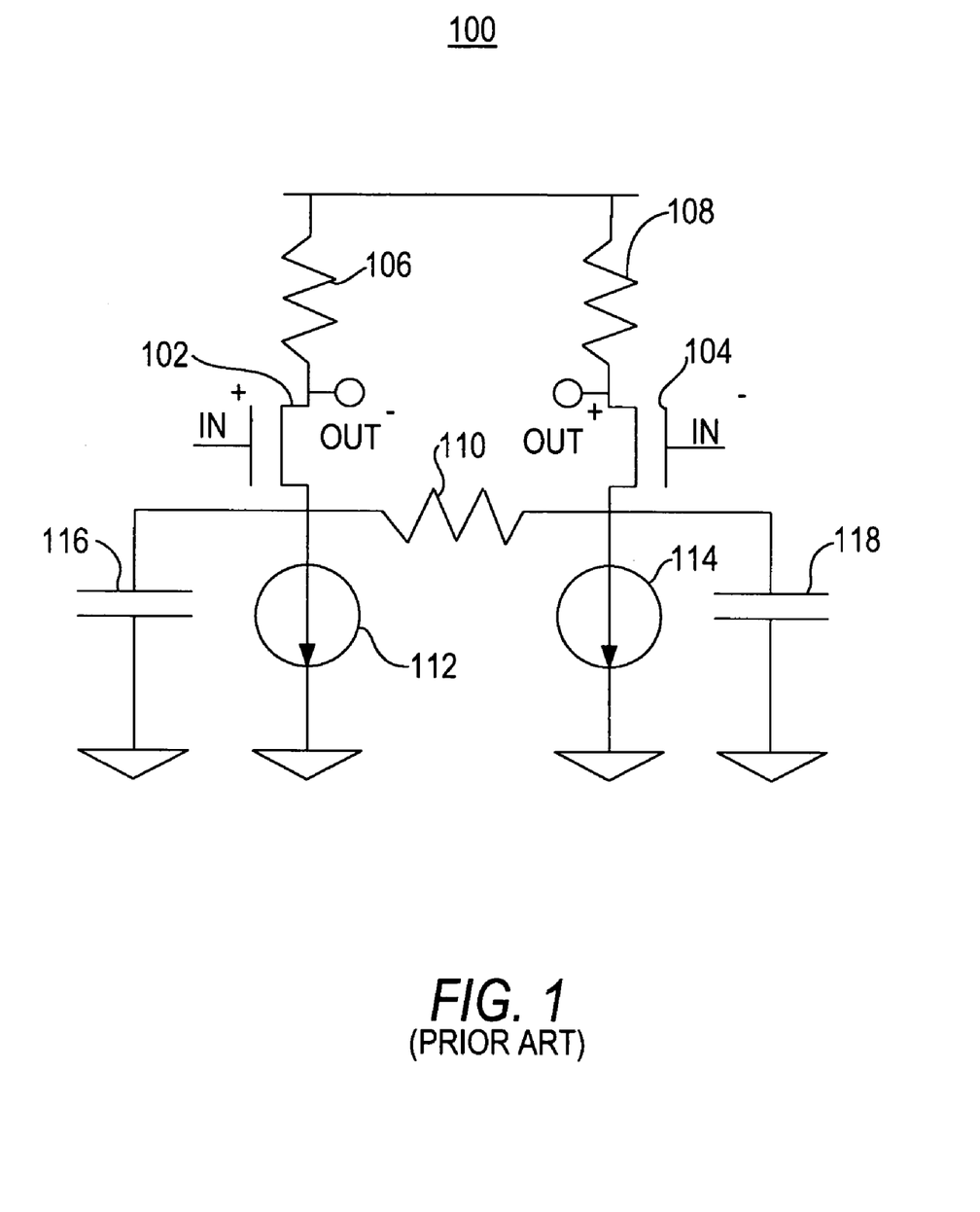
FIG. 1 shows an illustrative equalization stage for providing equalization to a received data signal in accordance with the prior art.

FIG. 1 shows an illustrative equalization stage 100 for providing equalization to a received data signal in accordance with the prior art. Equalization stage 100 may be part of an equalization circuit that is configured to boost the high-frequency components of a received data signal. Equalization stage 100 may include transistors 102 and 104, load resistors 106 and 108, source degeneration resistor 110, tail current sources 112 and 114, and shunt capacitors 116 and 118.

For the purposes of illustration and not limitation, it will be assumed that the received data signals are differential signals. One skilled in the art should appreciate that the principles of the present invention will also apply to single-ended signals.

The positive and negative ends of the received data signal may be applied to the gates of transistors 102 and 104, respectively. If the positive end of the data signal is higher than the negative end of the data signal, more current from current sources 112 and 114 is permitted to flow across transistor 102 than across transistor 104. As a result, the voltage drop across resistor 106 is greater than the voltage drop across resistor 108. This causes the positive end of the output to have a higher voltage than the negative end of the output. On the other hand, if the negative end of the data signal is higher than the positive end of the data signal, the voltage drop across resistor 108 is greater than the voltage drop across resistor 106 and the negative end of the output has a higher voltage than the positive end of the output signal. In this approach, equalization stage 100 produces an output signal that has the same basic pattern as the received data signal.

When the resistances of resistors 106, 108, and 110 are relatively large, the behavior of equalization stage 100 becomes a function of the resistances of resistors 106, 108, and 110 and capacitors 116 and 118. In particular, low-frequency components of the data signal flow across resistor 106 or 108 and resistor 110. Capacitors 116 and 118 appear to be open circuits to low-frequency signals. The low-frequency gain of equalization stage 100 may be kept low by keeping the resistances of resistors 106, 108, and 110 within the same order of magnitude. In particular, the low-frequency gain of equalization stage 100 is one when the resistances of resistors 106 and 108 are equal to half the resistance of resistor 110.

The high-frequency components of the data signal may be boosted by equalization stage 100 relative to the low-frequency components of the data signal. When the high-frequency components of the data signal flow across resistor 106 or 108, the data signal may prefer to flow across capacitor 116 or 118 because the impedances of capacitor 116 and 118 are much lower than that of resistor 110. The impedances of capacitor 116 and 118 are also much lower than that of resistors 106 and 108, which causes a gain to be applied to the high-frequency components of the data signal that is proportional to the ratio of the resistances of the resistor 106 and 108 to the impedances of capacitor 116 and 118. As a result, equalization stage 100 boosts the bit transitions in the data signal.

The resistance of resistor 110 and the capacitances of capacitors 116 and 118 may be programmable. This allows the amount of gain provided to the different frequency components of the data signal to be configurable. In some embodiments, resistor 110 and capacitors 116 and 118 may be programmed using memory (e.g., configurable RAM).

It should be understood by one skilled in the art that the configuration of equalization stage 100 is merely illustrative. Any suitable configuration may be used to implement equalization stage 100 without departing from the scope of the present invention. In particular, transistors 102 and 104 may be NMOS or PMOS transistors or bipolar junction transistors. Alternatively, equalization stage 100 may be implemented with a class-AB input stage. The configuration of equalization 100 may be selected based on the intended utilization and application of equalization stage 100. In addition, one skilled in the art should understand that shunt capacitors in equalization stage 100 may be replaced with one or more inductors in parallel with source degeneration transistor 110 without departing from the scope of the present invention.

This and other implementations of equalization circuitry are discussed in greater detail in Bereza U.S. Patent Publication No. 2005/0095988, Maangat U.S. Pat. No. 6,870,404, Wong et al. U.S. patent application Ser. No. 10/762,864, filed Jan. 21, 2004, Wong et al. U.S. Pat. No. 7,492,816, Wang et al. U.S. patent Ser. No. 10/967,459, filed Oct. 18, 2004, and Maangat et al. U.S. patent application Ser. No. 11/182,658, filed Jul. 14, 2005, which are hereby incorporated by reference herein in their entireties.

Figure 2A:
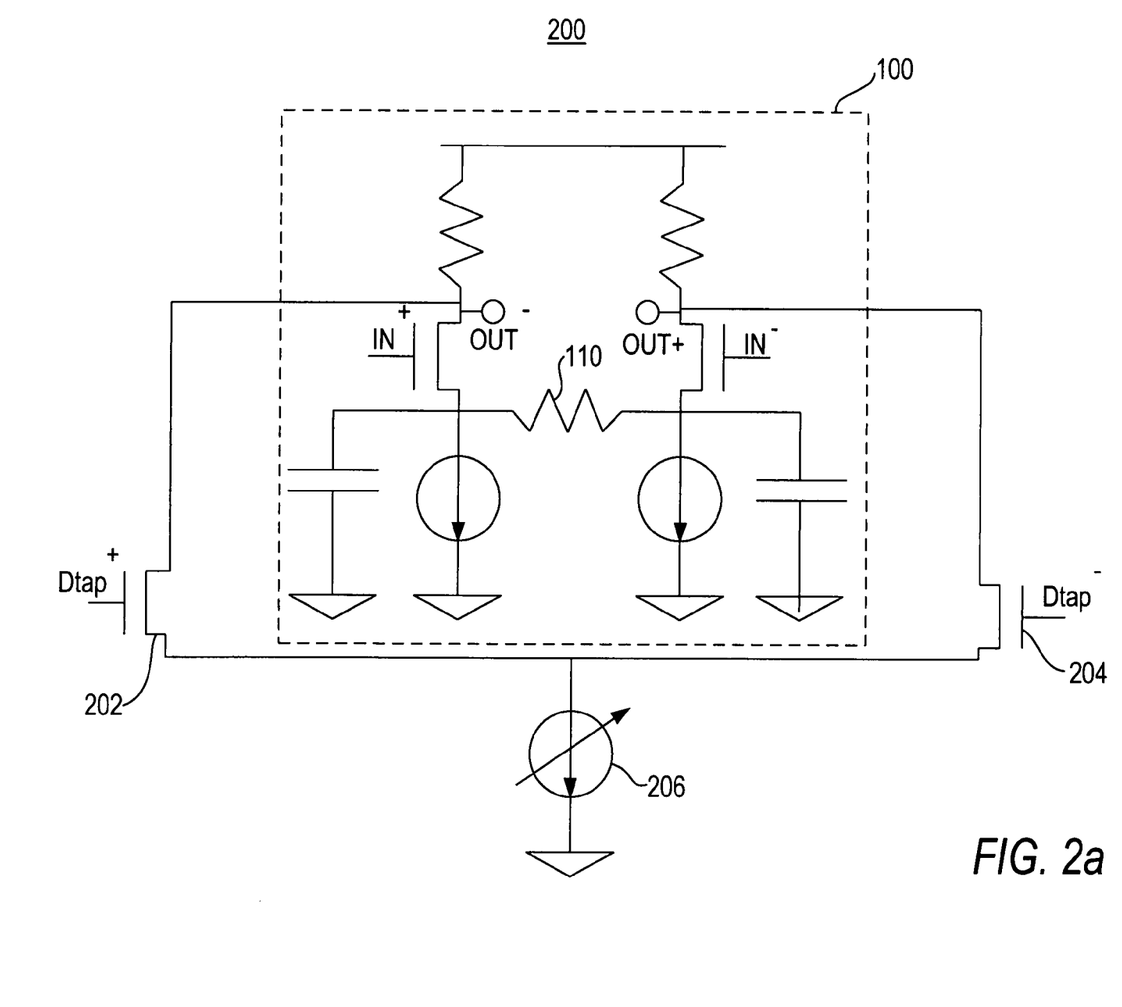
FIG. 2a shows an illustrative equalization stage that includes decision feedback equalizer (DFE) functionality in accordance with the present invention.

FIG. 2a shows an illustrative equalization stage 200 that includes decision feedback equalizer (DFE) functionality in accordance with the present invention. Equalization stage 200 may include equalizations stage 100 (FIG. 1), transistors 202 and 204, and programmable current source 206.

When the positive and negative ends of a differential signal are applied to the gates of transistors 202 and 204, either transistor 202 or 204 may pass the current produced by programmable current source 206, depending on the polarity of the differential signal. The voltage on either the positive end or negative end of the output of equalization stage 100 may be lowered as a result of the additional voltage drop across resistor 106 or 108 in equalization stage 100. In particular, when the positive end of the differential signal is high, transistor 202 passes a current and the voltage drop across resistor 106 in equalization stage 100 causes the voltage on the negative end of the output of equalization stage 100 to decrease. Likewise, when the negative end of the differential signal is high, transistor 204 passes a current and the voltage drop across resistor 108 in equalization stage 100 causes the voltage on the positive end of the output of equalization stage 100 to decrease.

The current from programmable current source 206 is programmable. As such, the amount of voltage adjustment to the positive and negative ends of the differential signal may be controlled. In some embodiments, a control signal may be stored in memory (e.g., configurable RAM) that specifies the amount of current produced by programmable current source 206.

It should be understood by one skilled in the art that transistors 202 and 204 may be any suitable type of transistor including, for example, NMOS and PMOS transistors and bipolar junction transistors.

The principles of equalization stage 200 may also be applied to single-ended data signals. In particular, a transistor may be coupled between the output of a single-ended equalization stage and a programmable current source to selectively adjust the output voltage of the equalization stage based on the bit value of a preceding bit.

Figure 2B:
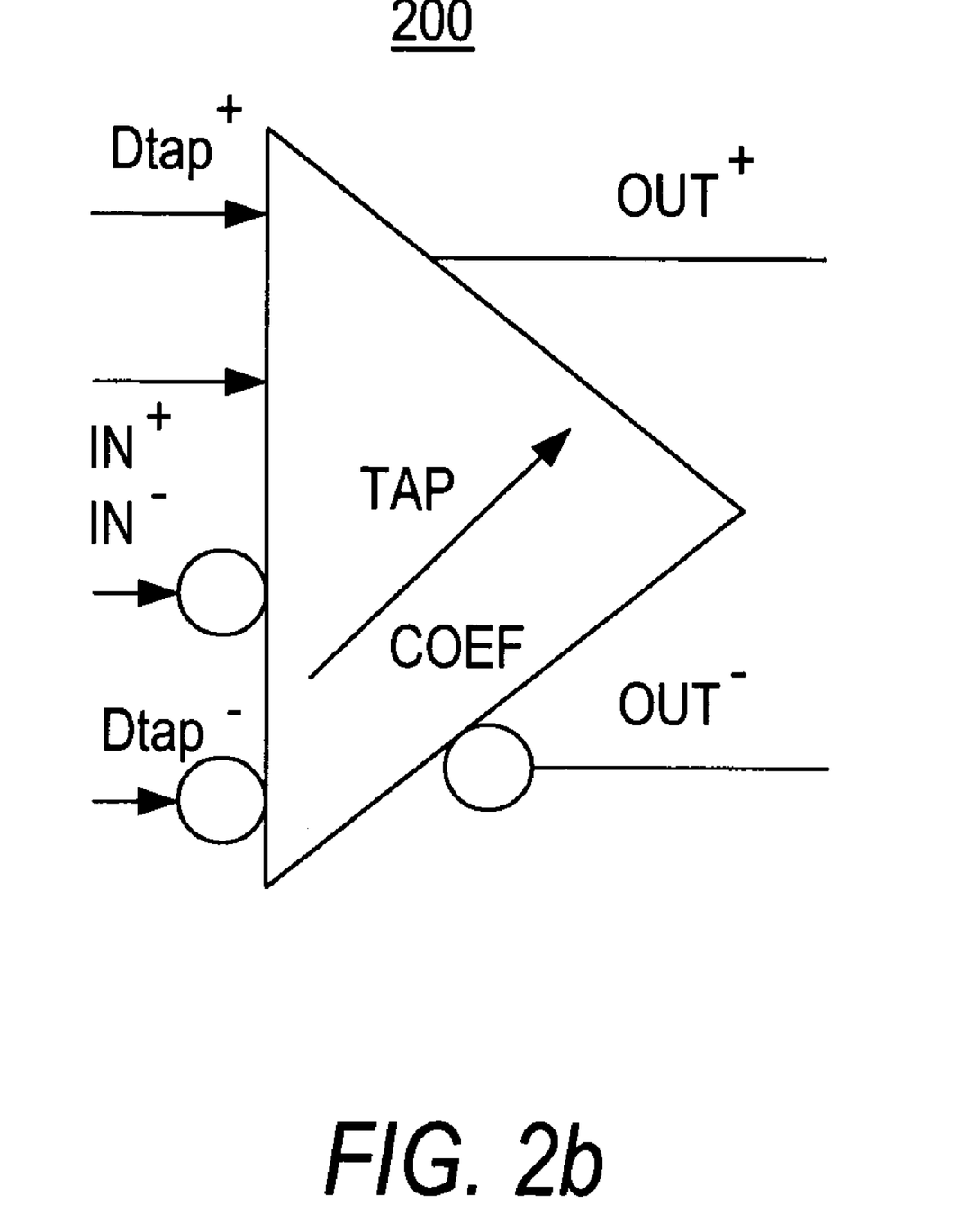
FIG. 2b shows an illustrative representation of an equalization stage that includes DFE functionality in accordance with the present invention.

FIG. 2b shows an illustrative representation of equalization stage 200 that includes DFE functionality in accordance with the present invention. As shown in FIG. 2b, equalization stage 200 (FIG. 2a) may be represented as a symbol having the same inputs and outputs as equalization stage 200.

Figure 3A:
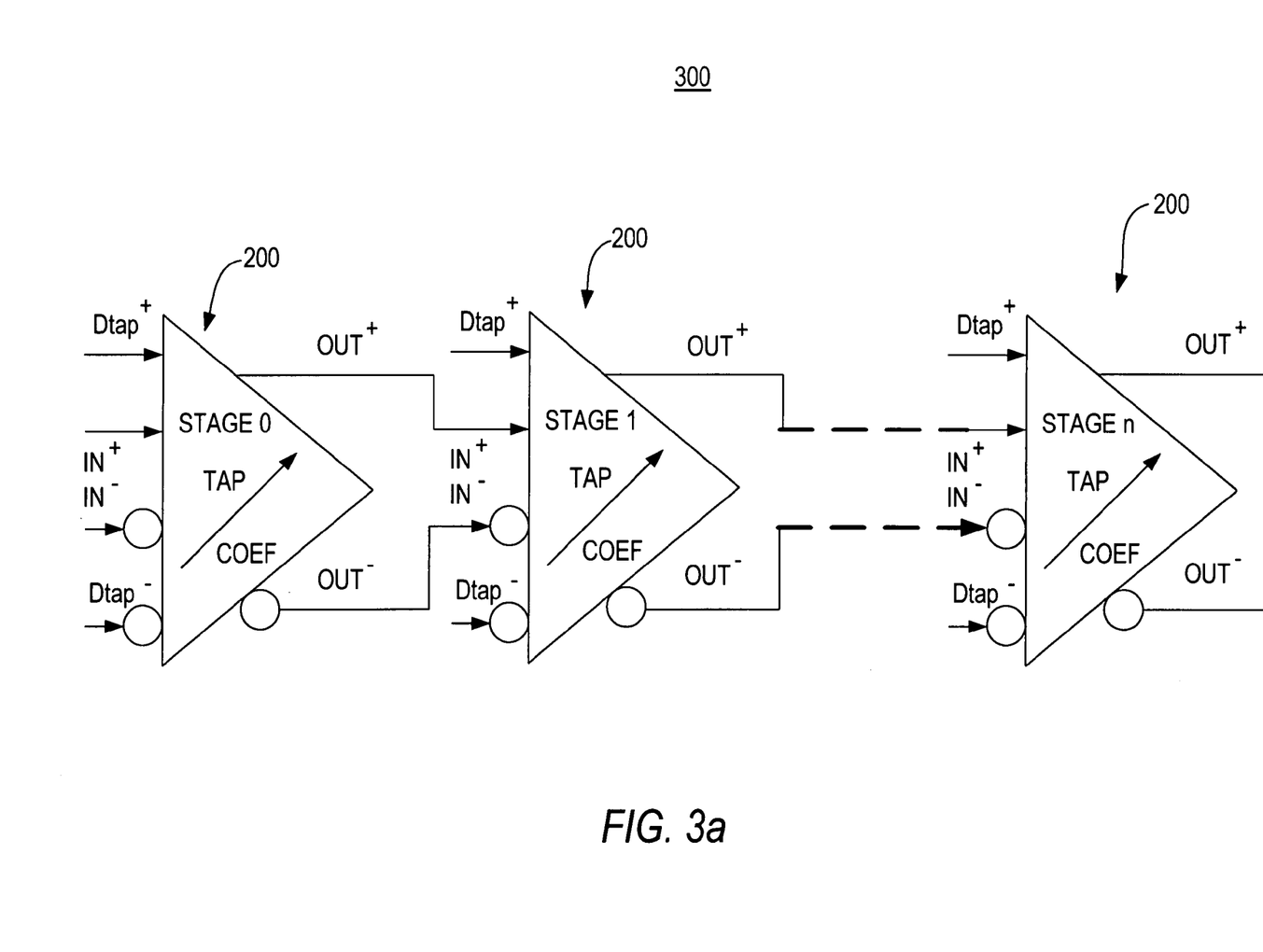
FIG. 3a shows an illustrative multi-stage equalization circuit that includes DFE functionality in accordance with the present invention.

FIG. 3a shows an illustrative multi-stage equalization circuit 300 that includes DFE functionality in accordance with the present invention. Equalization circuit 300 includes at least two equalization stages 200 (FIG. 2a-b). Equalization circuit 300 may be implemented using any suitable number of equalization stages 200. The number of equalization stages 200 in equalization circuit 300 may be selected based on the data rate of the data signal being processed by equalization circuit 300.

Equalization stages 200 may be cascaded such that the outputs of equalization stages 200 are connected to the inputs of adjacent equalization stages 200. The first equalization stage 200 may receive the data signal and the last equalization stage 200 may produce an output data signal. Each equalization stage 200 may provide gain to high-frequency components of the data signal. The amount of gain provided to the high-frequency components of the data signal may be configurable.

Equalization stages 200 may each receive DFE inputs for adjusting the output data signal of the equalization stage 200. The DFE inputs may be applied to transistors 202 and 204 of each equalization stage 200 to compensate for intersymbol interference in the data signal. The amount of voltage adjustment to be provided by each equalization stage 200 may be stored in memory (e.g., configurable RAM). The memory may control the amount of current produced by programmable current source 206 in each equalization stage 200.

Figure 3B:
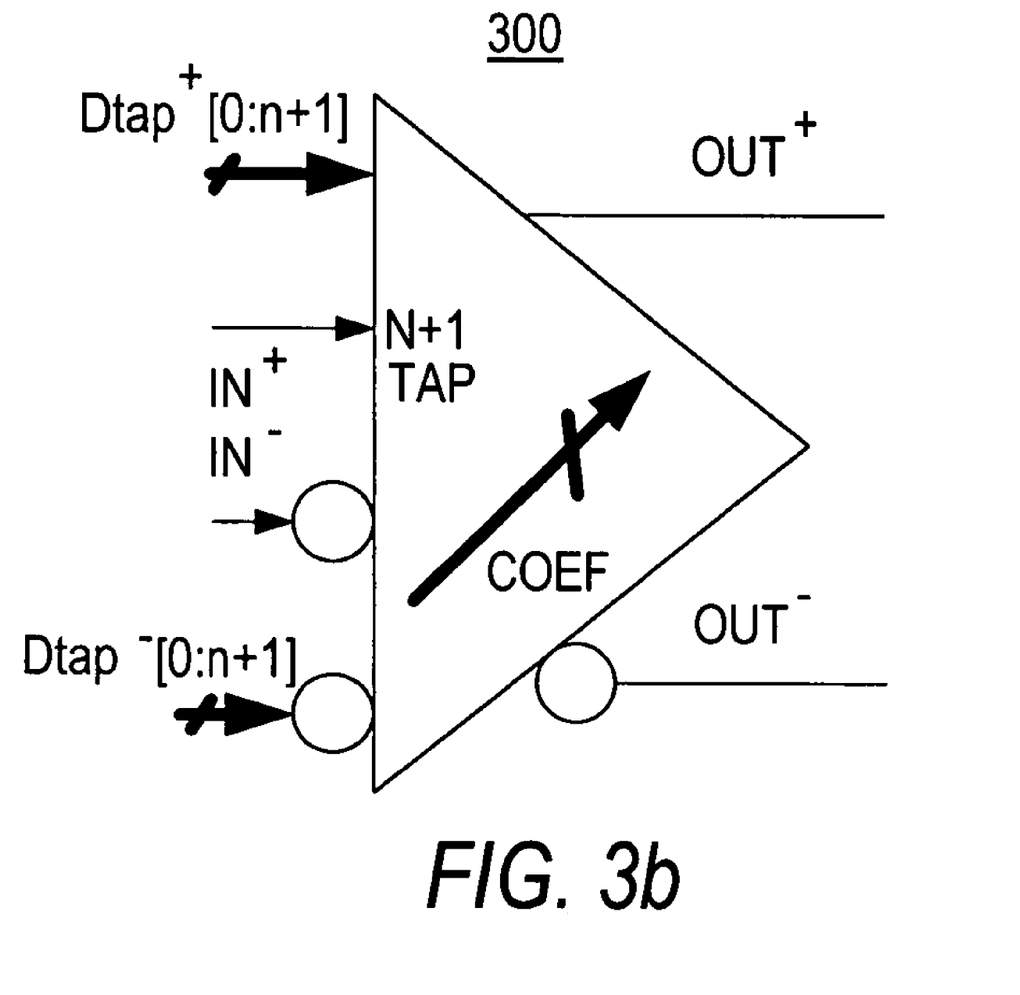
FIG. 3b shows an illustrative representation of a multi-stage equalization circuit with DFE functionality in accordance with the present invention.

FIG. 3b shows an illustrative representation of multi-stage equalization circuit 300 with DFE functionality in accordance with the present invention. As shown in FIG. 3b, equalization stage 300 (FIG. 3a) may be represented as a symbol having the same inputs and outputs as equalization stage 300. The DFE inputs for an N+1 stage equalization circuit may be represented as a bus having N+1 data lines.

Figure 4:
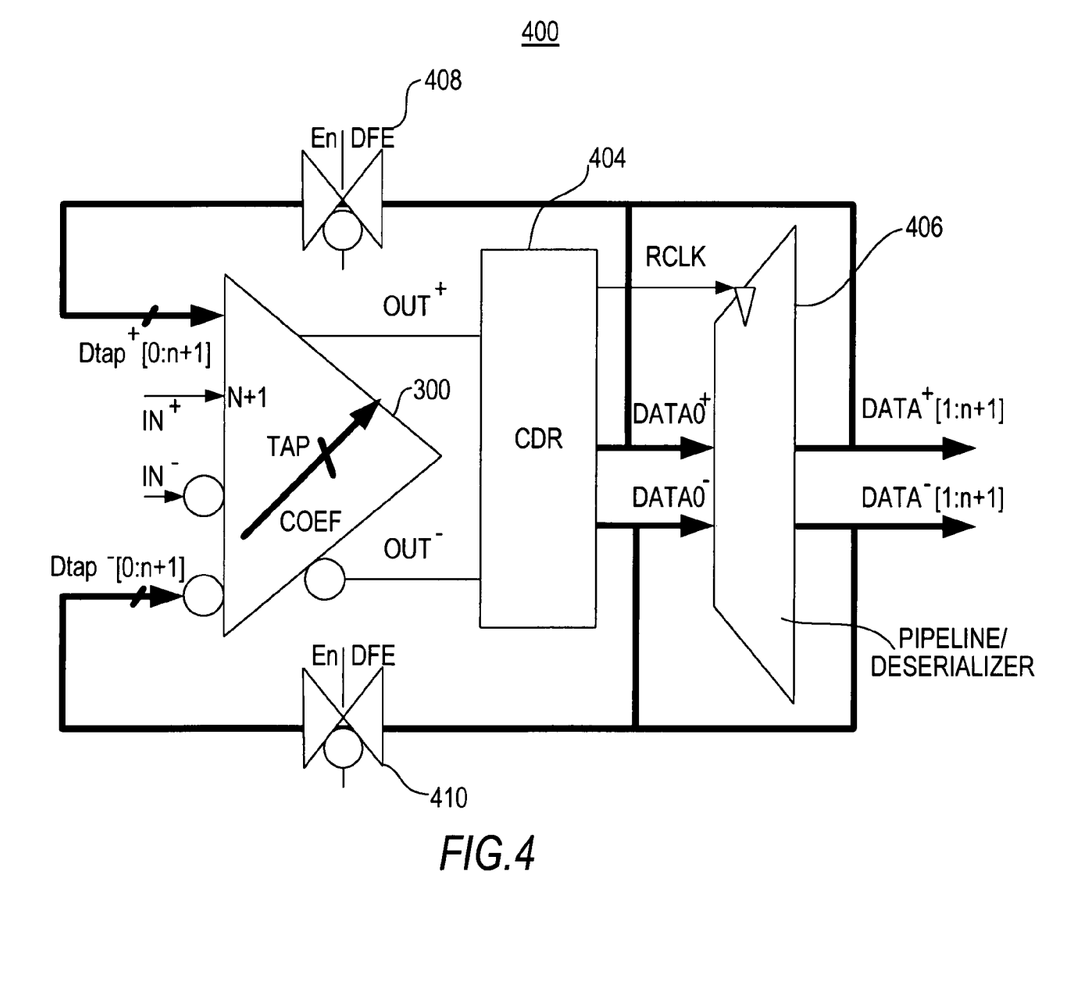
FIG. 4 shows an illustrative circuit diagram of a receiver that includes a multi-stage equalization circuit with DFE functionality in accordance with the present invention.

FIG. 4 shows an illustrative circuit diagram of a receiver 400 that includes multi-stage equalization circuitry with DFE functionality in accordance with the present invention. Receiver 400 may include equalization circuitry 300 (FIG. 3a-b), clock data recovery (CDR) circuitry 404, pipeline/deserializer 406, and DFE switches 408 and 410.

Receiver 400 may perform equalization and decision feedback equalization using equalization circuitry 300 (FIG. 3). Receiver 400 may initially provide equalization to the data signal because receiver 400 may lack information to perform decision feedback equalization. Receiver 400 must have processed at least the preceding bit in the data signal before decision feedback equalization may be performed on the current bit in the data signal. Preferably, decision feedback equalization is performed with bit values for as many preceding bits as equalization stages in equalization circuit 300. Until decision feedback equalization may be performed, equalization circuitry 300 may boost bit transitions in the data signal by providing gain to high-frequency components in the data signal.

CDR circuitry 404 may recover a data signal and clock signal from the output of equalization circuitry 300 by detecting bit transitions in the output of equalization circuitry 300. Examples of CDR circuitry are shown in references such as Aung et al. U.S. Pat. No. 7,227,918, Lee et al. U.S. Pat. No. 7,366,267, Lee et al. U.S. Pat. No. 6,650,140, Venkata et al. U.S. Pat. No. 7,180,972, Venkata et al. U.S. Pat. No. 7,305,058, Venkata et al. U.S. Pat. No. 7,138,837, Venkata et al. U.S. Pat. No. 6,867,616, Churchill et al. U.S. Pat. No. 7,340,021, Asaduzzaman et al. U.S. Pat. No. 7,352,835, Asaduzzaman et al. U.S. Pat. No. 7,149,914, Venkata et al. U.S. Pat. No. 6,888,376, Wang et al. U.S. Pat. No. 7,143,312, Kwasniewski et al. U.S. Pat. No. 7,486,752, and Shumarayev et al. U.S. patent application Ser. No. 11/040,342, filed Jan. 21, 2005, which are hereby incorporated by reference herein in their entireties.

The bits in the data signal recovered by CDR circuitry 404 may be stored in pipeline/deserializer 406. It should be understood by one skilled in the art that pipeline/deserializer 406 may be a pipeline, deserializer, or any other suitable alternative.

In some embodiments, the data signal and clock signal recovered by CDR circuitry 404 may be provided to pipeline 406. Pipeline 406 may include a plurality of stages connected in series. Preferably the number of stages in pipeline 406 is equal to or greater than the number of stages in equalization circuitry 300. For example, if equalization circuitry 300 includes "N" stages, pipeline 406 includes at least "N" stages. After CDR circuitry 404 recovers a data bit and a period of the clock signal, the data bit may be stored in the first stage of pipeline 406. The data bit may be shifted to subsequent stages of pipeline 406 as additional bits are clocked into pipeline 406 from CDR circuitry 404. In some embodiments, pipeline 406 may be implemented as a bit shifter. Pipeline 406 may be clocked on either the rising or falling edge of the recovered clock signal.

In some embodiments, the data signal and clock signal recovered by CDR circuitry 404 may be provided to deserializer 406. Deserializer 406 may convert the serial data signal produced by CDR circuitry 404 into a parallel data signal. Preferably deserializer 406 produces an equal or greater number of parallel bits than equalization stages in equalization circuit 300. For example, if equalization circuit 300 includes "N" stages, deserializer 406 produces a parallel data signal preferably having at least the preceding "N" bits recovered by CDR circuitry 404. In effect, deserializer 406 shifts the bits in the parallel data signal once every clock period to allow the most recent bit in the recovered data signal to be included as the least significant bit of the parallel data signal.

Switches 408 and 410 may selectively feed back the values stored by pipeline/deserializer 406 to equalization circuitry 300 to enable equalization circuitry 300 to perform decision feedback equalization for the current bit in the data signal. If enabled, switches 408 and 410 may apply the preceding bits stored in pipeline/deserializer 406 to the corresponding DFE inputs in equalization circuitry 300. In some embodiments, switches 408 and 410 may control the number of DFE inputs being provided to equalization circuitry 300. For example, switches 408 and 410 may provide two DFE inputs to equalization circuitry 300 to allow equalization circuitry 300 to compensate for distortion caused by two preceding bits.

In some embodiments, the bits stored in pipeline/deserializer 406 may be applied sequentially to the equalization stages in equalization circuitry 300. For example, the bit stored in first pipeline stage (e.g., the first preceding bit) may be fed into the DFE input for the first equalization stage in equalization circuit 300. The first equalization stage may be configured to adjust the data signal to remove the expected amount of distortion caused by the first preceding bit.

In some embodiments, any bit stored in pipeline/deserializer 406 may be applied to any DFE input of equalization circuitry 300. For example, the fourth preceding bit may be fed into the DFE input for the second equalization stage in equalization circuit 300. The second equalization stage may be configured to adjust the data signal to remove the expected amount of distortion caused by the fourth preceding bit. In this approach, receiver 400 may include circuitry for programmably routing bits from pipeline/deserializer 406 to the DFE inputs of equalization circuitry 300.

After equalization circuitry 300 has been provided with bit values for preceding bits, equalization circuitry 300 may perform decision feedback equalization. In particular, equalization circuitry 300 may attribute selected amounts of voltage in the current bit of the data signal to distortion caused by the preceding bits based on the values of the preceding bits and the positions of the preceding bits in relation to the current bit.

Equalization circuitry 300 may remove the distortion caused by the preceding bits from the data signal. In particular, the preceding bits may enable either transistor 202 or 204 in each equalization stage of equalization circuitry 300 to pass a current produced by programmable current source 206. As described above, the positive end of the output is adjusted downwards when the positive end of the preceding bit was high and the negative end of the output is adjusted downwards when the negative end of the preceding bit was high. The amount by which the positive or negative end of the output is adjusted may be determined based on the amount of current and the amount of load resistance at the positive or negative output node.

DFE coefficients may control the amount of current produced by programmable current source 206 in each equalization stage. The DFE coefficient may be a function of the amount of distortion attributed to the preceding bit applied to each equalization stage, the behavior of programmable current source 206, and the amount of load resistance on the output node of each equalization stage. The DFE coefficient for each equalization stage may be applied to the programmable current source for that stage to draw current from the output node of the equalization stage such that the adjustment in the output compensates for the distortion caused by the corresponding preceding bit. Preferably, removing the distortion for the current bit is performed by the equalization stages within one clock cycle of the recovered clock signal to allow subsequent bits to be processed by equalization circuitry 300.

In some embodiments, DFE coefficients for each preceding bit may be measured by laboratory test equipment (e.g., a parameter analyzer, spectrum analyzer, etc.). The laboratory test equipment may determine the amount of distortion caused by each preceding bit on the current bit and the amount of current required to remove the distortion caused by each preceding bit from the current bit. For example, a test bit may be transmitted across a backplane and the DFE coefficients for the test bit may be measured. The number of DFE coefficients that are measured may be equal to the number of equalization stages in equalization circuitry 300. In this approach, DFE coefficients for the maximum number of preceding bits that may be stored by receiver 400 may be measured.

In some embodiments, DFE coefficients for each preceding bit may be predicted or simulated. For example, the DFE coefficients may be derived based on known preemphasis coefficients. In another example, the S-parameters of the transmission medium may be measured and the DFE coefficients may be calculated based on the S-parameters and taking into account link attenuation and group delay effects. In another example, LMS adaptive filtering algorithm may be used to determine the DFE coefficients.

In some embodiments, receiver 400 may include an engine for dynamically determining the DFE coefficients for removing the distortion caused by preceding bits. This is discussed in greater detail in Shumarayev et al. U.S. patent application Ser. No. 11/192,539, filed Jul. 28, 2005, which is hereby incorporated by reference herein in its entirety. However, it may not be practical or cost effective to include an engine for dynamically determining DFE coefficients in low-cost receivers because this circuitry requires a large amount of die area to implement. For low-cost receivers, it may be preferable to allow the user to program fixed coefficient values for each equalization stage in configurable memory. The fixed coefficient values may be predicted or measured as described above.

If pipeline/deserializer 406 is able to provide all equalization stages in equalization circuit 300 with values of preceding bits and DFE coefficients, each equalization stage may adjust the data signal to remove the distortion caused by the corresponding preceding bit. As a result of removing the distortion caused by preceding bits, CDR circuitry 404 may more accurately recover the bit value of the current bit in the data signal, which reduces the bit error rate of receiver 400.

The foregoing is merely illustrative of the principles of this invention and various modifications can be made by those skilled in the art without departing from the scope and spirit of the invention.

What is claimed is:

1. Circuitry comprising:
   a first equalization circuit that applies a gain to bit transitions in a data input signal;
   a first current source that produces a first current;
   a first switch that selectively couples the first current source and the first equalization circuit to adjust a bit in the data signal being output by the first equalization circuit;
   a second equalization circuit that applies a gain to bit transitions in the data signal being output by the first equalization circuit;
   a second current source that produces a second current; and
   a second-stage switch that selectively couples the second current source and the second equalization circuit to adjust a bit in the data signal being output by the second equalization circuit,
   wherein a first preceding bit in the data signal being output by the second equalization circuit determines how the first switch selectively couples the first current source and the first equalization circuit, and a second preceding bit in the data signal being output by the second equalization circuit determines how the second-stage switch selectively couples the second current source and the second equalization circuit.

2. The circuitry of claim 1, wherein an output of the first equalization circuit is coupled to a load resistor and wherein drawing the current across the load resistor when the first current source and the first equalization circuit are coupled adjusts a voltage of a bit in the signal being output by the first equalization circuitry.

3. The circuitry of claim 1, wherein the data input signal is a differential signal.

4. The circuitry of claim 3, further comprising a second switch that selectively couples the first current source to the first equalization circuit.

5. The circuitry of claim 1, wherein the first current source is a programmable current source.

6. The circuitry of claim 5, further comprising memory to store a value that adjusts the current produced by the first current source.

7. The circuitry of claim 1, wherein the gain applied by the first equalization circuit to the bit transitions in the data input signal is programmable.

8. Circuitry comprising:
   equalization circuitry that adjusts a current bit of a data signal to remove a distortion caused by preceding bits in the data signal;
   clock data recovery circuitry that recovers the preceding bits from an output of the equalization circuitry;
   memory that stores the preceding bits; and
   a plurality of first switches, each of which selectively feeds a respective one of the preceding bits stored in the memory back to control a respective one of a plurality of second switches, each of the second switches causing the equalization circuitry to adjust the current bit based on the preceding bit that controls that one of the second switches.

9. The circuitry of claim 8, wherein the equalization circuitry includes a plurality of equalization stages coupled in series.

10. The circuitry of claim 9, wherein each of the equalization stages receives a respective one of the preceding bits and adjusts the current bit of the data signal by reference to said one of the preceding bits.

11. Circuitry comprising:
   serially connected equalization stages that successively adjust a current bit of a data signal based on a respective one of preceding bits in the data signal, each of the equalization stages including a switch for responding to a respective one of the preceding bits by adding or not adding equalization to the current bit depending on that preceding bit; and a circuit for recovering from an output signal of a last one of the serially connected equalization stages all of the preceding bits on which all of the equalization stages base adjustment of the current bit.

12. The circuitry of claim 11, further comprising:

clock data recovery circuitry that recovers the preceding bits from an output of the equalization stages;

memory that stores the preceding bits; and a plurality of switches that selectively feeds the preceding bits stored in the memory back to the equalization stages, wherein feeding the preceding bits back enables the equalization stages to adjust the current bit by reference to the preceding bits.

13. The circuitry of claim 11, wherein the equalization stages apply a gain to bit transitions in the data signal.

14. The circuitry of claim 13, wherein the gain applied by the equalization stages to the bit transitions in the data signal is programmable.

15. The circuitry of claim 12, wherein the equalization stages remove the distortion by adjusting the current bit by an amount.

16. The circuitry of claim 15, further comprising another memory to store values that determine the amount.

17. The circuitry of claim 12, wherein the clock data recovery circuitry recovers a clock signal and wherein the clock signal is used to clock the preceding bits into the memory.

18. The circuitry of claim 12, wherein the memory comprises a deserializer or pipeline.

19. Circuitry comprising:

a first equalization stage that adjusts a current bit of a data signal by a first amount based only on a first preceding bit in the data signal; and a second equalization stage that further adjusts the adjusted current bit of the data signal by a second amount based only on a second preceding bit in the data signal, wherein the second equalization stage receives the adjusted current bit from the first equalization stage, and wherein the circuitry further comprises a circuit for recovering from an output signal of the second equalization stage both the first preceding bit and the second preceding bit.

20. The circuitry of claim 19, wherein the first equalization stage applies a gain to bit transitions in the data signal.

21. The circuitry of claim 19, wherein the gain applied by the first equalization stage to the bit transitions in the data signal is programmable.

22. The circuitry of claim 19, wherein the data signal is a differential signal.

23. The circuitry of claim 19, wherein the first and second amounts are programmable.

24. The circuitry of claim 23, further comprising memory to store a value that determines one or both of the first and second amounts.

25. The circuitry of claim 19, wherein no bit separates the first preceding bit from the current bit and no bit separates the second preceding bit from the first preceding bit.

* * * * *